United States Patent
Brown et al.

(10) Patent No.: US 6,322,607 B1
(45) Date of Patent: Nov. 27, 2001

(54) ZINC-AMMONIUM PHOSPHATE FERTILIZERS

(75) Inventors: Anthony Martin Brown, Mt Gravatt; Thomas Welsh, Camp Hill; Christopher Wallace Dowling, Toowoomba, all of (AU)

(73) Assignee: Incitec Ltd., Murrarrie (AU)

( * ) Notice: Subject to any disclaimer, the term of this patent is extended or adjusted under 35 U.S.C. 154(b) by 0 days.

(21) Appl. No.: 09/355,023

(22) PCT Filed: Jan. 19, 1998

(86) PCT No.: PCT/AU98/00022

§ 371 Date: Jul. 19, 1999

§ 102(e) Date: Jul. 19, 1999

(87) PCT Pub. No.: WO98/31648

PCT Pub. Date: Jul. 23, 1998

(30) Foreign Application Priority Data

Jan. 17, 1997 (AU) .................................. PO4660

(51) Int. Cl.[7] ........................... C05B 17/00; C05B 19/00
(52) U.S. Cl. ................................. 71/33; 71/48; 71/64.03
(58) Field of Search ............................. 71/33, 48, 64.03; 423/306

(56) References Cited

U.S. PATENT DOCUMENTS

| | | | |
|---|---|---|---|
| 3,520,651 | * | 7/1970 | Philen et al. ............................. 71/33 |
| 3,560,192 | | 2/1971 | Di Cicco et al. . |
| 3,620,708 | * | 11/1971 | Ott ........................................ 71/33 |
| 4,154,593 | | 5/1979 | Brown et al. . |

FOREIGN PATENT DOCUMENTS

| | | |
|---|---|---|
| 12113/70 | 9/1971 | (AU) . |
| 39899/85 | 9/1986 | (AU) . |
| 86177 | 5/1978 | (FR) . |
| 1 263 719 | 2/1972 | (GB) . |
| 96-018854/02 | 5/1995 | (RU) . |

OTHER PUBLICATIONS

Y.P. Daug, et al., "Availability of Zinc and Phosphorus as Affected by Applied Zinc Compounds in Soil," Indian Journal of Agricultural Research, vol. 26, No. 2, 1992 pp. 91–99, (No Month).
S. Jeyaraman et al., "Effect of Zinc Application on Spikelet Sterility in Rice", Indian Journal of Agronomy, vol. 34, No. 4, 1989, pp. 487–488, (No Month).
Written Opinion (PCT Ruele 66), dated Jan. 25, 1999.
Written Opinion (PCT Rule 66) dated Sep. 24, 1998.
M. Koshino, "Movement of Applied Zinc is Soils –1 Zinc Movement as Affected by its Sources and Granulation with Fertiliser Salts", Soil Science and Plant Nutrition, vol. 20, 1974, pp. 331, (No month).
P.M. Giordano, et al., "Response of Corn to Zn in Ortho–and Pyrophosphate Fertilisers, as Afected by Soil Temperature and Moisture", Agronomy Journal, vol. 70, 1978, pp. 531–534, (No Month).
Mortvedt, "Crop Response to Level of Water–Soluble Zinc in Granular Zinc Fertilizers", Fertilizer Research, 1992, pp. 249–255, (No Month).
Mortvedt, "Crop Response to Applied Zinc in Ammoniated Phosphate Fertilizers", J. Agr. Food Chem, vp;/ 16, No. 2, Mar.–Apr. 1968, pp. 241–245, (No Month).
Amrani et al., "Zinc Plant Availability as Influenced by Zinc Fertilizer Sources and Zinc Water–Solubility", Colorado State University Technical Bulletin, Sep. 1997, pp. 1–10.

* cited by examiner

Primary Examiner—Wayne Langel
(74) Attorney, Agent, or Firm—Stroock & Stroock & Lavan LLP

(57) ABSTRACT

A process of obtaining a co-granulate of zinc and ammonium phosphate having a N/P ratio of 0.6–1.9 which includes initially feeding ammonium phosphate in finely divided form with a zinc source such as zinc oxide or zinc sulphate into a granulator wherein ammonia may also be fed into the granulator to increase the N/P ratio. The co-granulate is then obtained after drying.

27 Claims, 8 Drawing Sheets

ZINC-AMMONIUM PHOSPHATE FERTILIZERS

FIELD OF THE INVENTION

THIS INVENTION relates to an improved zinc-ammonium phosphate fertilizer which is adapted to facilitate improved zinc uptake in soil or by plants when compared to conventional zinc-ammonium phosphate fertilizers.

BACKGROUND OF THE INVENTION

Zinc is an element that is an essential trace element of soil and is often lost from soils by leaching during weathering and soil formation so that many soils contain less than 50 ppm zinc (Gilkes CSBP and Farmers Ltd.—Productivity Focus, January 1994). In this reference, it is also stated that zinc fertilizers produce substantial increases in the yield and quality of grains, pastures, fruits, fibres and animals and thus it may be concluded that zinc uptake in soil and plants is an extremely important criterion of zinc fertilizer efficiency in use.

Zinc fertilizers are discussed in Chapter 3 of the Proceedings of the International Symposium on "Zinc and Soil and Plants" which was held at The University of Western Australia on Sep. 27–28, 1993 and which has now been published by Kluwer Academic Publishers and edited by A. D. Robson. In this reference, it is stated that the four most common classes of zinc fertilizers include:

(i) inorganic sources such as $ZnSO_4$, $ZnO$, $ZnCO_3$, $Zn(NO_3)_2$ and $ZnCl_2$;

(ii) synthetic chelates inclusive of Zn (EDTA);

(iii) natural organic complexes; and (iv) inorganic complexes such as $Zn(NH_3)_4$ and $ZnSO_4$.

$ZnSO_4$ is the most common source and is sold in both crystalline and granular form. This is also true of ZnO but the effectiveness of ZnO is low when sold in granular form because of its very low solubility in water.

The most common method of application of zinc is soil application. Zinc fertilizers are mainly applied to soils in combination with NP (nitrogen-phosphorus) fertilizers which may include di-ammonium phosphate (DAP) or mono-ammonium phosphate (MAP) either by incorporation by granulation or bulk blending in granular form with other granular fertilizers. Granular NP fertilizers are used as carriers for Zn because it allows for more uniform distribution with conventional granulation apparatus which is described, for example, in International Publication No. WO95/21689.

However, when zinc sources are incorporated in NP fertilizers during wet granulation, under the relevant conditions of high temperature and moisture, chemical reactions may reduce the plant availability of some zinc sources. For example, insoluble zinc ammonium phosphate ($ZnNH_4PO_4$) may be formed in the presence of ammonium ion and phosphate ion in the granulator. Thus zinc ammonium phosphate is formed which is not available for crops, especially in sandy neutral or alkaline soils under dry conditions. In another example, when a synthetic chelate such as ZnEDTA is mixed with phosphoric acid before ammoniation, acid decomposition of the chelate molecule results in decreased availability of some Zn fertilizers as described in Mortvedt, 1968, J. Agr. Food Chem. 16 241–245.

In relation to bulk blending Zn fertilizers with granular NP fertilizers, one advantage that is obtained by this procedure is that fertilizer grades can be produced which will require the recommended rates of Zn, N and P for a given targeted yield. However, the main disadvantage of this procedure is that segregation of Zn can occur during the blending operation and with subsequent handling. Segregation results in non-uniform application which is critical with Zn because the application rate of Zn is low. Segregation mainly occurs because of the fact that the particle size of Zn fertilizer is substantially less than that of the NP granules and thus the blended fertilizer will have localized pockets of excessively high concentrations of Zn.

Coating Zn fertilizers onto granular NP fertilizers may eliminate the possibility of segregation. The Zn fertilizer should be ground to a finely divided state such as less than 0.25 mm to adhere to the NP granules. However, the coating method has been found in some cases to be ineffective because of separation between the NP fertilizer core and the Zn coating whereby the coating falls off and provides a substantial "dust" or finely divided particulate material which renders the resulting fertilizer less ineffective in use as well as being of nuisance value.

Reference is made to U.S. Pat. No. 4,154,593 which relates to a process of granulating ammonium phosphate wherein the ammonium phosphate is subjected to a shearing operation in a kneading mill or pug mill and is also ammoniated prior to being passed into a rotary drum granulator in the form of a slurry or melt. Additional ammonium sulphate may also be passed into the granulator in the form of a slurry or melt as well as additional amounts of ammonia. A heat of reaction is then generated in the granulator wherein at least a portion of the reactable components of the slurry or melt are reacted. This reference also refers to the addition of zinc as a solid filler also being introduced into the granulator.

However, it is considered that as ammonia and ammonium phosphate in the form of a slurry or melt are added to the granulator, then this will mean that the zinc will react with the ammonium phosphate or ammonia to form a resulting complex so as to inhibit the zinc from being freely available for uptake into soil and plants. In other words, the available zinc is "locked up" and uptake is prevented.

AU 554749 refers to a process for producing micro-nutrient containing fertilizer wherein particulate phosphate containing fertilizer, such as ammonium phosphate, is treated with a mineral acid and the fertilizer material is tumbled in the presence of particulate micro-nutrient material inclusive of a zinc compound so that the zinc compound is bonded to external surfaces of the fertilizer material while the external surfaces are wetted with acid. This reference, therefore, is an example of coating granular NP fertilizers with micro-nutrient and this therefore has the disadvantage of separation occurring as described above.

U.S. Pat. No. 3,560,192 describes a similar coating process wherein the fertilizer granules are coated with micro-nutrient in the presence of a binder which is a solution of zinc chloride. However, the micro-nutrient is still applied to external surfaces of the fertilizer granules and separation may still occur as described above in relation to AU 554749.

RU 2034817 refers to production of granulated fertilizer which comprises adding a mixture of calcium carbonate and magnesium carbonate to ammonium phosphates and wherein the resulting mixture is granulated at 80–100° C. The problem of zinc uptake in soil and plants is not discussed in this reference.

Similar comments apply to GB 1263719 which refers to tumbling or agitating ammonium phosphate, urea and a potassium salt at an elevated temperature in the presence of 0.5–5.0% by weight of water based on the mixture and drying the resultant granules at less than 90° C. The addition of zinc is not specifically mentioned in this reference and the problem of enhancing zinc uptake in plants or soil is not addressed.

BE 861277 refers to ammonium sulphate fertilizers which also contain the trace elements, copper and zinc, wherein 0.2–0.6 parts of copper and 0.7–2.0 parts of zinc are incorporated per 1000 parts of total composition. These compositions are prepared by dissolving the trace elements in phosphoric acid and treating the resulting solution with ammonia until the N/P ratio is about 2.0. In this reference, the problem of enhancing zinc uptake in plants and soil is not addressed and, in any event, the zinc would be presumably "locked up" because of reaction with diammonium phosphate during granulation or by reaction with phosphoric acid.

SU 1481230 refers to addition of theophylline, a zinc containing additive to wet process phosphoric acid, neutralization with ammonia, drying the slurry so obtained and granulating the slurry. This reference does not teach the reaction of ammonium phosphate with zinc and, in any event, the zinc would not be available for uptake because of its reaction with phosphoric acid.

AU 445640 refers to preparation of granular fertilizers wherein initially particulate ammonium phosphate having an initial N:P atomic ratio in the range of 0.8:1 to 0.95:1 are granulated in the presence of water at a temperature of 30–100° C. and treating such particulate material with ammonia during granulation. The particulate material may also contain potassium chloride, ammonium nitrate and urea. The use of zinc is not specifically mentioned in this reference.

Reference may also be made to the Indian Journal of Agronomy, 1989, 34(4) 487–488 which refers to studying the effects of zinc coated fertilizers wherein the fertilizer is ammonium phosphate in relation to rice. This reference suffers from the same problems referred to above wherein the zinc coating may separate from the fertilizer.

Reference may also be made to Koshino, Soil Science and Plant Nutrition, 1974, 20 331 or the Journal of the Science of Soil and Manure, Tokyo, 1973, 44(6) 217–222 wherein reference is made to ammonium phosphate coated with zinc and zinc uptake in soils. Similar comments can therefore be made in relation to this reference as made above in relation to AU 554749 or U.S. Pat. No. 3,560,192.

In Giordano et al., 1978, Agronomy Journal 70 531–534, reference is made to pot trials where fertilizer pellets are made by pressing the powdered fertilizer and micro-nutrient into pellets in a press. This reference, therefore, makes no reference to a commercial granulation technique.

Reference may also be made to Daug et al., 1992 Indian Journal of Agricultural Research, 26(2) 91–99, which refers to zincated fertilizers prepared by dry and wet blending including use of diammonium phosphate (DAP) as the fertilizer. Again, this reference does not refer to use of commercial granulation techniques and it would seem that in relation to the blend of DAP and zinc compound that no improvement was noted in relation to zinc uptake in soil or plants.

SUMMARY OF THE INVENTION

It therefore is an object of the invention to provide a method of manufacture of a zinc-ammonium phosphate fertilizer co-granulate which provides relatively efficient zinc uptake in soil or plants.

The process of the invention includes the following steps:
(i) mixing solid pre-manufactured ammonium phosphate having an N/P ratio of 0.6–1.9 and a zinc source in the form of a slurry, suspension or particles with each other to form a resulting co-granulate in a granulator vessel; and
(ii) drying the co-granulate.

The crux of the present invention is the provision of a co-granulate of zinc source and ammonium phosphate wherein the zinc source or compound is mixed intimately with the ammonium phosphate.

Although not wishing to be bound by theory, it is considered that if a chemical reaction between the ammonium phosphate and zinc compound can be avoided or minimized during granulation, then this will inhibit "locking up" of the zinc and thus facilitating formation of the co-granulate whereby the zinc will be more readily available for uptake in soil and plants.

It is also believed that mixing of solid pre-manufactured ammonium phosphate with a zinc compound in the form of a slurry, suspension or particles will facilitate achievement of the abovementioned objective.

Use may be made of a conventional granulation plant as shown, for example, in International Publication No. WO95/21689. The granulator vessel is usually in the form of a rotatable drum which rotates about a horizontal axis. However, such granulator vessel may also comprise a blunger or pugmill. The ammonium phosphate may be fed into the granulator vessel in finely divided form (e.g. the size of the particles may be from 0.05–10 mm, more preferably 0.05–4 mm, and most preferably about 1 mm) after having been obtained commercially or produced at a site remote from the granulator vessel. Alternatively, the ammonium phosphate may be prepared in the granulation plant by prior reaction in a pre-neutraliser or pipe reactor. Alternatively, ammonia and phosphoric acid may be discharged into a reaction tower from a top end thereof before forming a reaction product of ammonium phosphate at the bottom of the tower.

Preferably the ammonium phosphate and zinc source are mixed with each other before being fed into the granulator vessel or, alternatively, they may be fed into the granulator vessel separately by conveyors or elevators for subsequent mixing to form the resultant co-granulate. In this latter embodiment, the zinc source and ammonium phosphate may be mixed in the granulator vessel as a rolling bed.

The ammonium phosphate is preferably MAP but DAP may also be utilized if desired. The N/P ratio is more preferably 0.8–1.5 and most preferably 1.0–1.5 to avoid addition of phosphoric acid to the granulator vessel. Most preferably, the N/P ratio is between 1.15–1.25.

The zinc source may be a zinc salt in commercial usage such as zinc sulphate or zinc oxide. Zinc oxide is preferably utilized.

It will also be appreciated that the zinc source may be applied to the rotatable granulator vessel in the form of a slurry or suspension or also in solid particulate form as the case may be.

Preferably the zinc source may be fed to the granulator at a feed rate of 1000 kg/hr to provide a granulated product containing at least 2.5% Zn.

It has also been found that ammoniation may also improve production rates in that there is a decreased evaporation load placed on the drier in the granulation plant. Ammoniation would also increase the N/P ratio of the ammoniation phosphate.

Thus, more specifically, when cold solid premanufactured MAP is fed to the plant, the solubility of the MAP increases upon increase of the N/P ratio which can occur by ammoniation. Granulation may therefore occur at a lower moisture content which results in a lower evaporation load in the drier.

Ammonia, therefore, may be charged into the granulator in gaseous form or sparged into the granulator in combination with steam.

Preferably steam may be fed to the granulator at a rate of 2500 lbs/hr in combination with 0.25 I/sec of ammonia although it will be appreciated that the rate at which steam is fed to the granulator is dependent upon the size of the granulator.

It is also desirable to use cold steam instead of hot steam as the resulting fertilizer will have an enhanced zinc uptake compared to the case when hot steam is used. It is also preferred that ammonia only be utilized at a moderate degree, i.e. to obtain an N/P ratio of 1.15:1.25 compared to excessive ammoniation where an increased N/P ratio is obtained. Moderate ammoniation also enhances zinc uptake in the resulting fertilizer.

The granulation process involving the mixing of zinc oxide with ammonium phosphate may take place in the presence of 2–6% of water. The granulation temperature may reach from 55–100° C. and more suitably between 60–80° C.

The process of the present invention may also be conducted in a granulation plant at a typical production rate of 10–100 tonnes per hour and more suitably 15–70 tonnes per hour.

The ammonium phosphate fines may be added to the granulator at a rate of between 10–100 tonnes per hour and more suitably between 30–100 tonnes per hour.

DESCRIPTION OF PREFERRED EMBODIMENT

Figure 1:
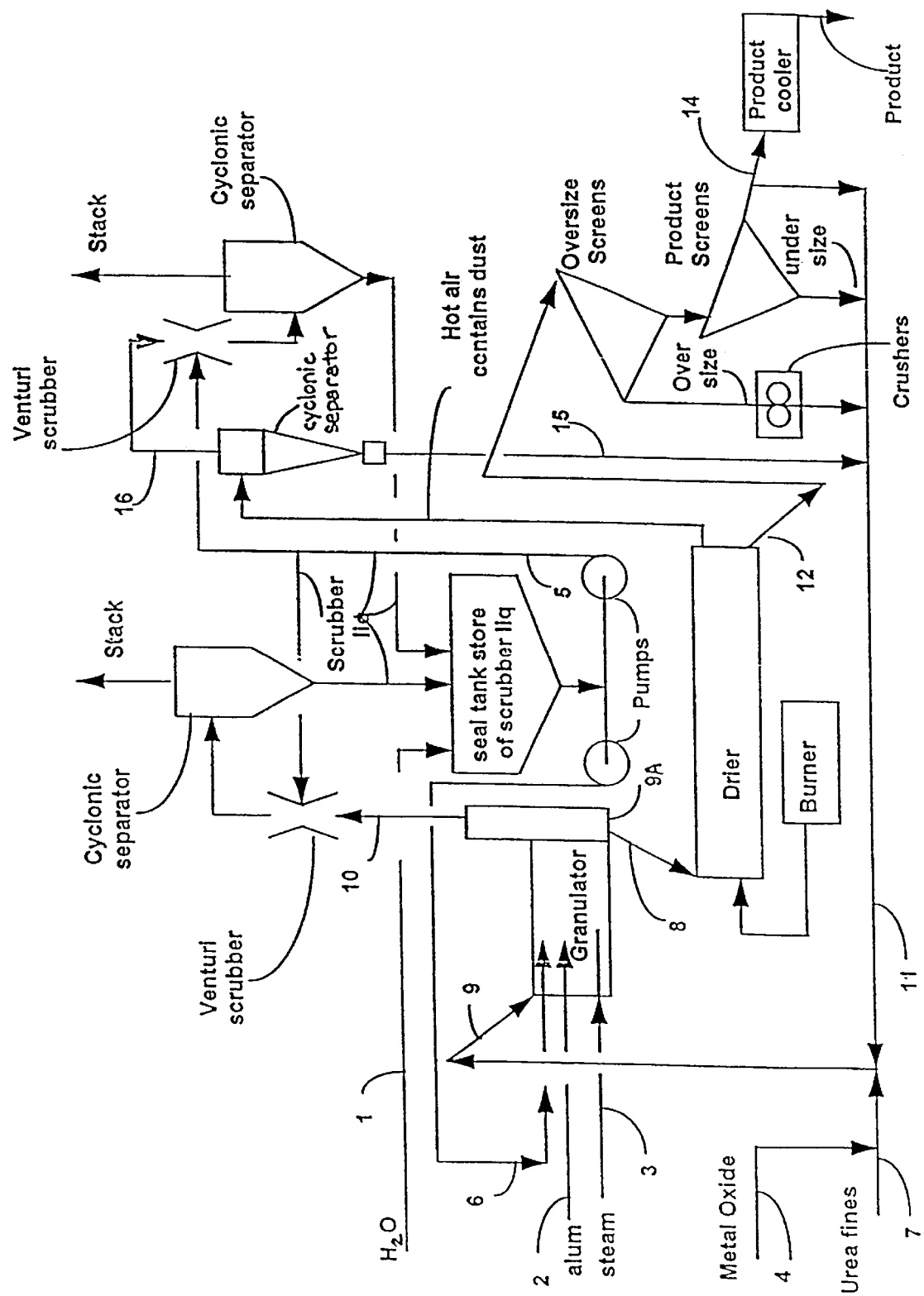
FIG. 1 This figure represents a process diagram for a typical NP granulation plant.

Steam admixed with ammonia (3) or separately sparged is used to sparge under the bed in the granulator and assist in granulation.

A spray or scrubber liquor (6) may in some cases be used to add more moisture to the granulation.

A recycled stream of fines may also be fed back to the granulator (11).

The granulated wet material (8) is then fed to a drier where heat is supplied usually concurrently and moisture is dried off.

The dried material (12) is then fed to screens where the product size is separated and either sent direct to storage or cooled (14) and sent to storage. The undersize is recycled and the oversize is crushed and also recycled to the granulator.

The air stream (10) from the granulator is scrubbed, usually in a venturi scrubber as shown and passed through a cyclonic separator and through a stack as shown. The air stream from the drier (5A) is passed through a cyclonic separator and then passed (16) to a venturi scrubber prior to passage through a further cyclonic separator.

The scrubber liquor from each cyclonic separator is passed to a central seal tank store as shown and recirculated through conduit (5). When additional mixture in the granulator from side streatm (6) is not required, the scrubber liquor is accumulated for later disposal. Water (1) may be fed to the seal tank store of scrubber liquor as shown. The air stream (16) from the adjacent cyclonic separator is fed to the venturi scrubber as shown. Discharge (15) from one of the cyclonic separators is discharged into the recycled stream of fines (11).

EXPERIMENTAL

Experiment 1

Materials and Methods

An experiment was conducted under glasshouse conditions at the Queensland Wheat Research Institute, Toowoomba, Queensland, Australia. Three wheat plants (var Pelsart) were established in each 200 mm pot. Soils used were a black earth from the Yallaroi district in north-west New South Wales, Australia and a brigalow grey clay soil from the Kuppun district, south-west of Dalby, Queensland, Australia. Relevant soil characteristics are described in Table 1.

The rates of application in each treatment are given in Table 2.

The zinc products were slurried in 20 mL of deionized water before application to the soil. Basal application of other nutrients were applied as follows:

| | |
|---|---|
| nitrate-N | 95 mg/kg |
| ammonium-N | 5 mg/kg |
| sulfate-S | 42 mg/kg |
| potassium | 144 mg/kg |
| calcium | 107 mg/kg |

All treatments had phosphorus applied to increase the level in each pot to 236 $mgkg^{-1}$. Each treatment was replicated three times. Deionized water was applied to maintain the soil around field capacity. The StZ was a fertilizer produced by the process of the invention and thus comprised a co-granulate of MAP and ZnO.

Assessment

Dry matter production from each pot was conducted at 10% head emergence (91 days after sowing). Sub-samples of plants were taken for plant tissue and zinc concentration. Apparent zinc uptake in whole plant tops were calculated for each treatment as the product of the dry matter (g $pot^{-1}$) and zinc concentration in plant dry matter ($mgkg^{-1}$).

Results

Soil Black Earth—Yallaroi

Dry matter

Product

A significant trend (P<0.2) difference was found between products tested. StZ produced the largest dry matter response followed by zinc sulfate, with zinc oxysulfate and zinc oxide producing similar results as reported in Table 3.

Rate

The application rate response to zinc addition was highly significant. For each increase of zinc rate, dry matter production increased. The most significant dry matter response occurred between 0 and 2.5 mg/kg of zinc. Rates of application above 2.5 mg/kg produced only a small dry matter response as reported in Table 4.

To establish the effectiveness of each zinc product form, regression curves for each product were fitted using a quadratic model. From the 90% maximum yield (90%MY), a relative effectiveness measure (RE) was calculated using the formula $$RE = \frac{\text{Rate (Standard Product)}}{\text{Rate (Other Product)}} \times 100$$

Zinc sulfate was used as the standard product for this assessment.

Based on the RE figures, StZ was 76% as effective as zinc sulfate (see Table 5) in increasing dry matter in this soil. Zinc oxysulfate and zinc oxide were less effective than StZ. This ranking is consistent with the results of a previous experiment in this soil using sorghum.

Differences of RE between StZ and zinc oxide should be noted (see Table 5) as the zinc form in StZ is zinc oxide. It is proposed that the difference in effectiveness is as a result of a synergistic effect between the close proximity of the phosphorus and zinc in each particle rather than any change in chemical composition during manufacture.

It has been proposed that the mechanism for enhanced zinc uptake with StZ may be a result of root proliferation around phosphorus concentrations (Kalra, Y. P. and Soper, R. J., 1968, Agron. J. 60 209–212) aiding zinc uptake.

Zinc Concentration in Dry Matter
Product

Response to StZ and zinc sulfate was significantly greater than zinc oxysulfate and zinc oxide. The difference between products remained relatively constant across rates up to 5 mg/kg of zinc but increased from 5–10 mg/kg (see FIG. 2). The difference between products corresponds to plateauing of dry matter response for zinc sulfate and StZ.

Rate

Zinc is a nutrient that increases in plant tissue in proportion to supply, the increase being moderated by dilution during the "grand" growth phase of the response curve. In this experiment, the response to zinc rate produced increases in plant tissue zinc concentration.

A plant tissue zinc concentration in whole tops of 15 mg/kg was used as the critical level for wheat at about 10% flowering (Reuter, D. J. and Robinson, J.B., 1986, Plant Analysis, An Interpretation Manual, Inkarta Press, pp 67–71).

Relative effectiveness of the zinc products in maintaining the plant tissue concentration was assessed by determining the rate of zinc supplied by each product that raised plant tissue concentration of dry matter to 15 mg/kg. Quadratic regression models were fitted to each product and the critical rate determined (see Table 6).

Zinc application rate required to raise the plant tissue concentration to the critical value was found to be lower for zinc sulfate and StZ and greater for zinc oxysulfate and zinc oxide. Relative effectiveness of StZ (compared to zinc sulfate) was the same as for dry matter production as achieving the critical zinc concentration (~75%) whereas zinc oxysulfate and zinc oxide were more effective in increasing tissue concentration than increasing dry matter production.

Zinc Concentration in Dry Matter

Zinc uptake is the amount of zinc taken up in the dry matter of plant tops as calculated from the zinc concentration and dry matter production at each rate for each product.

Zinc Uptake in Whole Plant Tops
Product

Zinc uptake pattern was found to be dominated by zinc concentration. Differences of zinc concentration were greater than for dry matter production (see FIGS. 3 and 4).

Zinc sulfate and StZ were found to be the most effective forms when both dry matter production and concentration were combined. These produced a significantly greater uptake than zinc oxysulfate which in turn was significantly more effective than zinc oxide as reported in Table 7.

Rate

Zinc uptake increased with each addition of zinc as shown in Table 8. The increase at each rate was significant ($P<0.05$).

Conclusion

This experiment showed the difference of performance of different zinc products and between application rates.

StZ and zinc sulfate were found to be more effective than zinc oxide and zinc oxysulfate for dry matter production and increasing zinc concentration in plant tissue. The most effective rate for application was found to be 1.5 to 2.0 mg zinc per kg of soil which corresponds to a field rate of 1.8 to 2.5 kg ha$^{-1}$ of zinc applied at sowing. Given that growing conditions during this experiment were extremely favourable compared to field conditions, it would be expected that the rates suggested above would apply to fully irrigated production and lower rates may be adequate for rain grown fields.

Results
Soil Brigalow Grey Clay Soil—Kupunn
Dry Matter Production
Product Comparison No significant ($P<0.05$) change in accumulation of dry matter was found between four zinc products for the Kupunn soil. However, zinc oxide, zinc oxysulfate and StZ showed a strong trend ($P<0.2$) for higher dry matter production zinc sulfate in this soil as reported in Table 9.

Application Rate

As a result of the variability of response between products across the application rates, the effect of zinc rate on dry matter accumulation was not significant.

Soil extractable (DTPA) zinc level of 0.3 mgkg$^{-1}$ suggests a high probability that the soil would be responsive to zinc application (Incitec Fertilizers Analysis Systems Interpretation Manual). A lack of dry matter response suggests that either the soil critical level is not correct for this soil type or on other factor was restricting yield.

Zinc Concentration in Whole Plant Tops
Product Comparison

The amount of zinc taken up by the crop and reflected in the tissue concentration was dependent on zinc product applied. The greatest zinc concentration was for StZ and zinc sulfate and uptake from zinc oxysulfate and zinc oxide was significantly less (as reported in Table 10). Mean plant tissue concentrations generated by zinc oxysulfate and zinc oxide suggest that these products were ineffective and plants in these treatments remained in a deficient state.

Application Rate

In the absence of a dry matter response to zinc application rates, the zinc concentration in the whole tops reflected the availability of zinc at the applied rate as reported in Table 11.

According to critical plant tissue concentrations (15 mg/kg) for whole shoots in wheat, quoted in *Plant Analysis* by Reuter and Robinson, 1986, supra, plots receiving no zinc were deficient and a dry matter response to zinc addition would have been expected. The "deficient" status of the control plot confirms the conclusion from soil analysis that zinc response potential exists. Reasons for a lack of dry matter response is not highlighted by measurements taken.

Generally, plant zinc concentration increased as the rate of zinc addition increased. The critical level for zinc in the plant was achieved between 1.25 and 5 kg ha$^{-1}$, the zinc rate required to reach the critical level being significantly affected by the zinc product.

Interaction of Zinc Compound and Application Rate

To determine the relative effectiveness (RE) of the four zinc products in the absence of a dry matter response, regressions of zinc concentration in plant tissue against zinc application rates were conducted for each product. Effective rate was determined as the rate of each product to produce a plant zinc concentration of 15 mg/kg.

Based on the data in Table 12, StZ was determined to be the most effective product for increasing zinc concentrations in plant tissue, followed by zinc sulfate. This data suggest that under high input/output wheat growing conditions that StZ should be applied at a rate that will supply approximately 2 kgha$^{-1}$ of zinc. Zinc oxysulfate and zinc oxide (applied separately to phosphate) were not effective sources of zinc in this soil type.

Wheat Uptake in Whole Plant Tops

Product Comparison

In the absence of a dry matter response, zinc concentration differences in plant tissue resulting from zinc compounds applied, has been a prime determinant of the significance of the differences in zinc sulfate. Zinc oxide produced the smallest uptake, with zinc sulfate and zinc oxysulfate producing a significantly higher uptakes. StZ produced the highest uptake as reported in Table 13.

Application Rate

Zinc uptake into plants generally increased with rate of application, however, uptake efficiency reduced as rates increased (as reported in Table 14). The apparent uptake efficiency calculated from the response data indicates that the efficiency was 1.92% for the 1.25 mg/kg$^{-1}$ rate and fell to 1.2% for the 10 mg/kg$^{-1}$ rate.

Product by Application Rate

The comparison of the application rates among product types is affected by the unexplained variability between the nil zinc control treatments. If the nil zinc control treatment for each product is replaced by the mean of the zinc oxide, StZ and zinc oxysulfate, the only interpretation of product response is zinc sulfate, which is more equitably treated.

Significant responses in zinc uptake were measured for each product except zinc oxide. StZ and zinc sulfate generated significant uptake responses to 1.25 mg/kg$^{-1}$ and responses above this rate were measured (as reported in Table 15). StZ generally produced the highest uptake at each rate of zinc.

A significant response to zinc oxysulfate was obtained at the 5 mg/kg rate placing it between StZ and zinc sulfate and above zinc oxide, in its availability.

Conclusion

The results of the product comparison in this experiment confirmed that zinc sulfate and the zinc in StZ are superior in plant availability to zinc oxysulfate and zinc oxide. In this soil, even though dry matter responses were not gained, significant increases in zinc concentration and zinc uptake highlighted the potential for dry matter response.

The most effective rate of zinc sulfate and zinc in StZ was found to be about 2 mg/kg (2–2.5 kg/ha equivalent) for the environmental conditions in which the experiment was conducted.

The performance of StZ in the Kupunn brigalow grey clay is similar to the results obtained in the black clay soil in winter crop evaluated earlier in this report and in maize.

Experiment 2

The objective of this experiment was to provide data to evaluate the effectiveness of the zinc in ammoniated StZ by:

(i) measuring the bio-availability of the zinc in ammoniated StZ in comparison to non-ammoniated StZ and the conventional zinc fertilizer which is zinc sulfate monohydrate; and (ii) determining whether the rate of ammoniation has any effect on zinc bio-availability.

Materials and Methods

The experiment was conducted as a glasshouse pot experiment at the facilities of Incitec Fertilizers, Toowoomba.

Soil used in the experiment was a grey clay (poplar box woodland soil from a field in crop south of Dalby. The bulk sample was taken to a depth of 10 cm. The soil zinc level had been confirmed as low for crop production by both soil analysis (as reported in Table 16) and foliar symptoms of zinc deficiency in the crop growing in the soil at the time of collection.

Soil (3.6 kg) was packed into 150 mm diameter pots containing plastic liners to prevent drainage. The pots were watered to about field capacity (predetermined). Background levels of nutrients N, K, S, Ca were added to the water to ensure growth was not restricted by these nutrients during the experiment.

Samples of the test fertilizer products, ammoniated StZ (N:P molar ratios of 1.17, 1.22, 1.27, 1.36), StZ (N:P molar ratio 1.0) and zinc sulfate monohydrate (zinc sulfate) were ground to minus 2 mm before weighing to enable measurement of the small quantities required for each pot.

The phosphorus levels in each treatment was made up to the rate applied in the highest P treatment by applying the appropriate rate of mono-ammonium phosphate with the test product in the seed hole.

The experiment was conducted as a core experiment, investigating the rate response in three products (zinc sulfate, 1.0 Stz and 1.36 StZ) at the equivalent of 0, 1, 2, 4, 6 kg/ha zinc and a subsidiary experiment consisting of all six products applied at 1, 2, 4 kg/ha zinc. Each treatment was replicated three times.

Each pot was sown with 10 seeds of grain sorghum (*Sorghum bicolor* L. Moench) cv Buster MR in pairs, the fertilizer treatment being placed in a hole beneath the seed. The pots were thinned to three plants per pot at the three leaf stage. The pots were watered with deionized water as required to keep the soil around field capacity.

Whole tops were harvested at the eight leaf stage (60 days after sowing), dry matter yield and zinc and phosphorus concentrations were measured.

Results

Dry Matter Accumulation

Zinc Product

A significant difference (p=0.01) in dry matter production was measured between the fertilizer products (as reported in Table 17). When compared to the standard treatment, zinc sulfate 1.0 StZ and 1.36 StZ were the only products to give significantly poor dry matter production. However, there was a trend for 1.22 StZ and 1.17 StZ to be superior to the other products. These products were significantly (p=0.05) more effective than 1.0 StZ and 1.36 StZ.

Zinc Rate

The response to rate of applied zinc was highly significant (p<0.01), with dry matter production plateauing between the 1 and 2 kg/ha Zn rates. This rate response is similar to that recorded in previous experiments with Gr. StZ in similar test conditions.

At zinc rates above 2 kg/ha Zn, there was a trend for dry matter production to decline. This decline was more strongly demonstrated in the core experiment where the 6 kg/ha Zn rate produced dry matter yield significantly (p=0.05) lower than the 2 kg/ha rate (see FIG. 5).

Dry Matter Zinc Concentration

Zinc Product

Zinc concentration in dry matter was found to vary with product applied. There was a significant interaction (P<0.1) between the product and rate of zinc applied (as reported in Table 18).

Currently there is no published data for critical zinc concentrations in whole tops at the eight leaf stage. It was concluded from the dry matter accumulation response and the zinc concentration response to zinc rate that the critical concentration for maximum dry matter production in this experiment was 10–14 mg/kg (see FIG. 6).

Using the critical zinc concentration as a measure of the product effectiveness, based on mean response was not considered due to the interaction between the rates and products and as a result of the dry matter response causing some growth dilution in zinc concentration. Under these circumstances, zinc uptake should be a more reliable discriminating factor for separating product performance.

Zinc Rate

Plant tissue concentration shows a significant (p<0.01) increase with increases in zinc fertilizer rate. The increases in zinc concentration were significant (P<0.05.) for each addition of zinc, with the greatest increases occurring where dry matter production had reached a plateau or was declining.

Zinc Uptake

Zinc Product

Of the zinc products tested, zinc sulfate produced the largest zinc uptake in whole plant tops. However, statistically (p=0.05) the 1.27 StZ and the 1.22 StZ products were equally effective as zinc sulfate. These three products were superior to 1.0 StZ, 1.36 StZ and 1.17 StZ.

Zinc Rate

The increase in zinc uptake with zinc rate applied reflected the strong rate response in dry matter and zinc concentration in the dry matter. The linear response in zinc uptake suggests that the dominant factor in the uptake was the zinc concentration. When dry matter production declined for zinc rates 2 kg/ha Zn, zinc uptake continued to increase.

Phosphorus

Tissue phosphorus concentration was not significantly different between products but was reduced with increasing zinc rate. The reduction in tissue concentration was not thought to have affected the results as the concentration was above the critical 0.21% P (Reuter and Robinson, 1986, supra) for all treatments.

The P uptake response to zinc rate reflected dry matter response rather than the tissue P concentration response. This indicates that a mechanism for the reduction in P concentration was related to growth dilution rather than a direct P—Zn antagonism in the soil or plant.

Conclusion

The soil selected for the experiment was found to be low enough in plant available zinc to give good discrimination between rates of applied zinc and between the fertilizer products. Dry matter, plant zinc concentration and zinc uptake in whole tops were increased by 29, 100 and 245% respectively, across rates of zinc applied.

Chemical forms of the Zn and/or P in the ammoniated StZ products appears to have been altered by the ammoniation process. The products with the highest of ammoniation (1.36 and 1.27) were inferior to the lower rates (1.22 and 1.17) in dry matter production (see FIG. 7), and were similar to the StZ product. Products from the lower rates of ammoniation were similar in dry matter production across the range of application rates to zinc sulfate, the standard measure of soil zinc availability from fertilizer sources.

Figure 8:
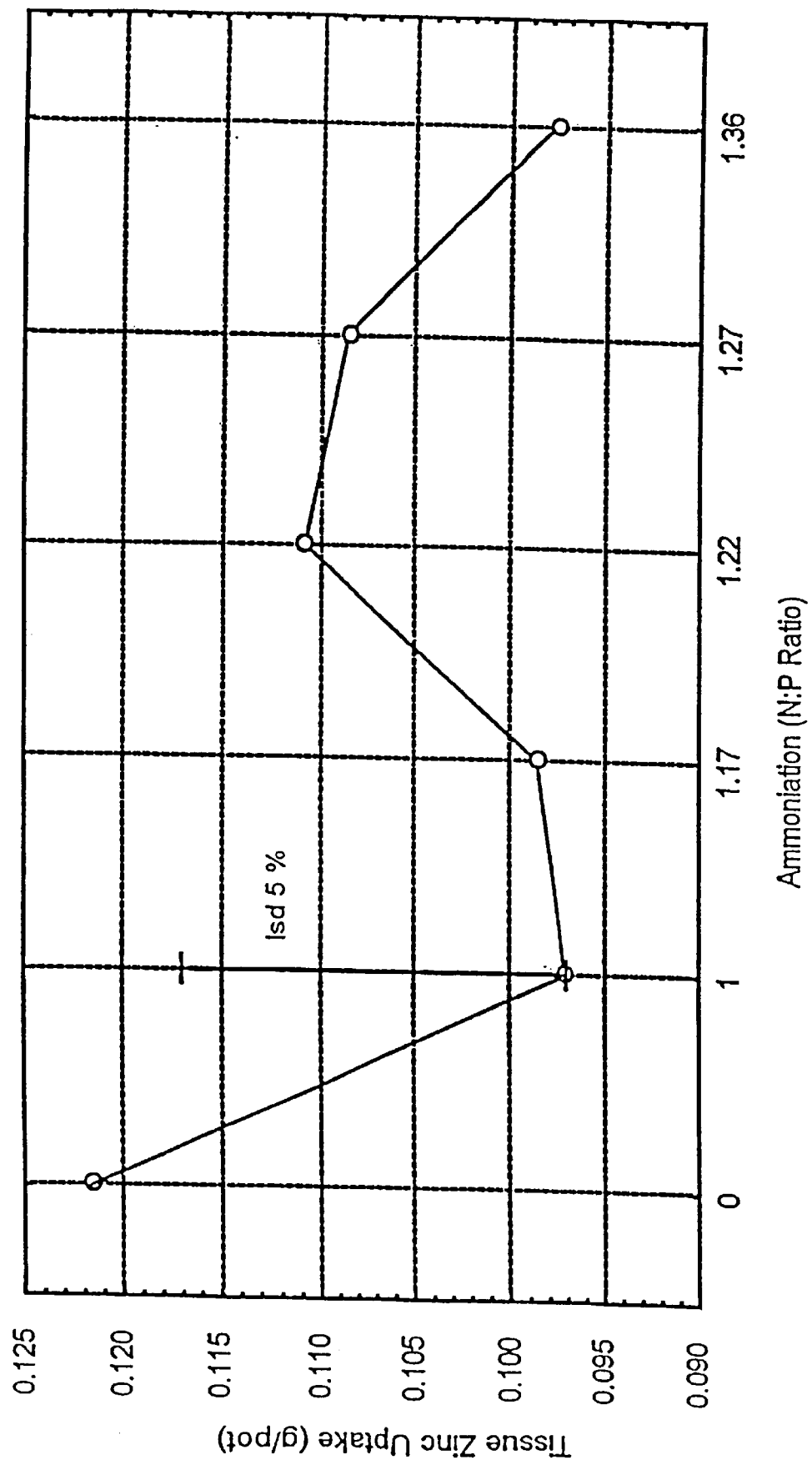
FIG. 8 This figure illustrates that the ammoniation rate of StZ affects the tissue zinc concentration in sorghum.

In contrast to dry matter production results, the best zinc uptake performance was from 1.22 StZ and 1.27 StZ products (see FIG. 8). These products were not significantly different to zinc sulfate.

From this analysis, it was concluded that ammoniation of StZ at molar ratios of up to 1.27 did not significantly change the availability of the zinc and that the addition of ammonia up to a product N/P ratio 1.27 be considered a standard production step. As grain yield was not measured for this experiment, it is recommended that ammoniation rates that gave the highest dry matter production (1.17 and 1.22) be given greater weight in the determination of final ammoniation rate because of the more direct relationship between dry matter production and grain yield than zinc uptake and grain yield.

This recommendation is made on the basis of assessment on a single soil and it should be noted that previous experiments have shown that the relative performance of the StZ product can be dependent on the soil used in the experiment. No such assessment has been conducted for these products, hence the efficacy of the product may vary on different soil types.

The reasons for the superior performance of the 1.17 and 1.22 ammoniated StZ was not evident from the data generated in this experiment.

Overall Conclusions (i) Zinc from StZ is available to wheat as determined by dry matter response, zinc concentration in dry matter and zinc uptake in whole plant tops at anthesis.

(ii) The application rate of StZ required to produce a response was similar to zinc sulfate when averaged across the two soil types evaluated. Zinc sulfate and StZ were superior to zinc oxide and zinc oxysulfate in both soil types.

(iii) The reasons for the difference in performance of zinc sulfate and StZ in different soils were not identified in this experiment therefore, until such factors are identified, application rates of zinc from both products should remain the same for a given circumstance.

(iv) Recommended application rates for zinc derived from Stz should be in the range 1–3 $kgha^{-1}Zn$ (raingrown to irrigated respectively.

(v) The difference in the performance of the zinc oxide in StZ and the zinc oxide applied separately is consistent with the results of the summer experiment. Differences of this type, apparently due to the method of manufacture, have not been reported in the scientific literature to date. The question remains, however, whether this property is unique to StZ or is also associated with the products produced using coating technology (e.g. Tecfeed™, Nutricote™).

As a result of the foregoing, it is considered that the ammonium phosphate-zinc fertilizer of the invention overcomes prior misgivings in relation to application of compounded zinc/phosphorus fertilizers because of previous research data that questioned the availability of the zinc to crops when such compounded zinc/phosphorus fertilizers were utilized previously. Such misgivings have precluded the use of zinc as a component in "starter" fertilizers in cropping for many years. With the advent of the present invention and a better understanding of the zinc/phosphorus interaction in the fertilizer of the invention, it is considered that if a chemical reaction between the phosphorus source and zinc source during manufacture can be avoided or minimised, zinc uptake to plants will be considered improved when compared to the prior art. This means that the zinc fertilizer of the invention will be equally effective whether applied pre-plant broadcast (traditional) or incorporated with the phosphate at sowing. It has now been established that the zinc in StZ is at least about 70–80% as effective as zinc sulphate making StZ as a viable alternative to zinc blended phosphate fertilizers such as Phozinc™ in the marketplace.

It is also suspected that the physical differences between the co-granulated StZ and Phozinc would favour the use of StZ in winter cereals. The superior performance of StZ is likely to result from clear spacing of the zinc source than in Phozinc in winter cereals wherein our fertilizer concentration ($gm^{-1}$) is significantly lower.

Tables

TABLE 1

Soil characteristics

| SOIL TYPE | YALLAROI | KUPPUN |
|---|---|---|
| Colour | Black | Grey |
| Texture | Clay | Clay |
| pH | 8.7 | 8.6 |
| $P_{(BICARB)}$ mg/kg | 9 | 7 |
| $P_{(LACTATE)}$ mg/kg | 6 | — |
| Zinc (DTPA) | 0.3 | 0.3 |
| OC % | — | 0.8 |

TABLE 2

Application rates of each product

| Treatment | Equivalent Field Rate (kg ha$^{-1}$) | Zinc Rate (mg/kg) | Zn SO$_4$ 35.5% Zn | ZnO (83% Zn) | ZnOZnSO$_4$ (18% Zn) | StZ (2.5% Zn) |
|---|---|---|---|---|---|---|
| 1 | 0.00 | 0.00 | 0.00 | 0.00 | 0.00 | 0.00 |
| 2 | 1.25 | 1.25 | 3.5 | 1.5 | 7 | 50 |
| 3 | 2.5 | 2.5 | 7.0 | 3.0 | 14 | 100 |
| 4 | 5 | 5 | 14.0 | 4.0 | 28 | 200 |
| 5 | 10 | 10 | 28.0 | 12.0 | 56 | 400 |

TABLE 3

Dry matter production from four zinc product sources

| Product | Dry Matter (g pot$^{-1}$) |
|---|---|
| zinc sulfate | 10.71 |
| zinc oxide | 10.29 |
| StZ | 11.46 |
| zinc oxysulfate | 10.26 |
| lsd 5% | 1.25 |

TABLE 4

Dry matter production in response to zinc application rate

| Zinc Application Rate (mgkg$^{-1}$) | Dry Matter (g pot$^{-1}$) |
|---|---|
| 0.00 | 9.22 |
| 1.25 | 10.10 |
| 2.5 | 11.20 |
| 5 | 11.33 |
| 10 | 11.54 |
| lsd 5% | 1.4 |

TABLE 5

Comparison of zinc rate of 90% maximum yield and relative effectiveness for four zinc products

| Product | Zinc Rate (90% max yield) (mg kg$^{-1}$) | r | Relative Effectiveness % |
|---|---|---|---|
| zinc sulfate | 1.6 | 0.93 | 100 |
| StZ | 2.1 | 0.78 | 76 |
| zinc oxysulfate | 3.1 | 0.88 | 52 |
| zinc oxide | 6.9 | 0.62 | 23 |

TABLE 6

Zinc application rate from four zinc sources to produce a critical zinc concentration of 15 mg/kg in whole tops of wheat

| Product | Zinc Rate (mg kg$^{-1}$) | r | RE % |
|---|---|---|---|
| zinc sulfate | 2.1 | 0.98 | 100 |
| StZ | 2.8 | 0.98 | 75 |
| zinc oxysulfate | 3.2 | 0.92 | 66 |
| zinc oxide | 3.7 | 0.25 | 57 |

TABLE 7

Effect of four zinc sources on zinc uptake in plant tops at head emergence in wheat

| Product | Zinc uptake (g pot$^{-1}$) |
|---|---|
| zinc sulfate | 0.189 |
| StZ | 0.186 |
| zinc oxysulfate | 0.151 |
| zinc oxide | 0.122 |
| lsd 5% | 0.027 |

TABLE 8

Effect of increasing soil zinc concentration on zinc uptake in wheat at head emergence

| Rate (mgkg$^{-1}$) | Zinc uptake (g pot$^{-1}$) |
|---|---|
| 0.00 | 0.104 |
| 1.25 | 0.130 |
| 2.5 | 0.157 |
| 5 | 0.191 |

TABLE 8-continued

Effect of increasing soil zinc concentration on zinc uptake in wheat at head emergence

| Rate (mgkg$^{-1}$) | Zinc uptake (g pot$^{-1}$) |
| --- | --- |
| 10 | 0.228 |
| lsd 5% | 0.029 |

TABLE 9

Dry matter production (whole tops) as a result of addition of zinc in four different compounds in wheat

| Product | Dry Matter (g/pot) |
| --- | --- |
| zinc sulfate | 13.35 |
| StZ | 14.34 |
| zinc oxysulfate | 14.40 |
| zinc oxide | 14.06 |
| lsd 5% | 1.08 |

TABLE 10

Zinc concentration (in whole tops) as a result of addition of four zinc compounds in wheat

| Product | Zinc concentration (mgkg$^{-1}$) |
| --- | --- |
| zinc sulfate | 16.2 |
| StZ | 17.4 |
| zinc oxysulfate | 13.5 |
| zinc oxide | 11.4 |
| lsd 5% | 1.5 |

TABLE 11

Zinc concentration in whole top of wheat at five rates of zinc fertilizer

| Application Rate (mgkg$^{-1}$) | Zinc concentration (mgkg$^{-1}$) |
| --- | --- |
| 0.00 | 11.1 |
| 1.25 | 13.3 |
| 2.5 | 13.5 |
| 5 | 16 |
| 10 | 19.1 |
| lsd 5% | 1.7 |

TABLE 12

Relative effectiveness (RE) and effective rate of the different zinc products

| Product | Effective Rate (mgkg$^{-1}$) | RE (%) | r |
| --- | --- | --- | --- |
| zinc sulfate | 2.66 | 100 | 0.97 |
| StZ | 2.00 | 133 | 0.98 |
| zinc oxysulfate | 6.88 | 39 | 0.84 |
| zinc oxide | 9.71 | 27 | 0.74 |

TABLE 13

Zinc uptake (in whole tops) as a result of addition of four zinc compounds in wheat

| Product | Zinc uptake (g/pot) |
| --- | --- |
| zinc sulfate | 0.213 |
| StZ | 0.251 |
| zinc oxysulfate | 0.194 |
| zinc oxide | 0.158 |
| lsd 5% | 0.022 |

TABLE 14

Zinc uptake in whole top of wheat at five rates of zinc fertilizer

| Application Rate (mgkg$^{-1}$) | Zinc uptake (g/pot) |
| --- | --- |
| 0.00 | 0.151 |
| 1.25 | 0.180 |
| 2.5 | 0.187 |
| 5 | 0.231 |
| 10 | 0.272 |
| lsd 5% | 0.025 |

TABLE 15

Zinc uptake in the whole tops of wheat at head emergence as affected by zinc compound applied and application rate

| | Product | | | |
| --- | --- | --- | --- | --- |
| Rate | Zinc oxide | StZ Zinc Uptake (g/pot) | Zinc oxysulfate | Zinc sulfate |
| 0.00 | 0.134 | 0.138 | 0.153 | 0.179 (0.141*) |
| 1.25 | 0.154 | 0.205 | 0.166 | 0.195 |
| 2.5 | 0.171 | 0.187 | 0.189 | 0.199 |
| 5 | 0.162 | 0.315 | 0.241 | 0.206 |
| 10 | 0.169 | 0.409 | 0.222 | 0.287 |
| lsd 5% | 0.05 | | | |

TABLE 16

Selected characteristics of the soil used in the experiment

| SOIL NUTRIENT | CONCENTRATION |
| --- | --- |
| Colour/texture | grey black clay |
| pH (1:5 water) | 8.5 |
| Organic carbon % C | 0.9 |
| Nitrate - N (mg/kg) | 11.0 |
| Phosphorus (Colwell) (mg/kg) | 7 |
| Zinc (DTPA) (mg/kg) | 0.2 |

TABLE 17

Effect of zinc product
and zinc rate on the dry matter production of sorghum

| | ZINC PRODUCT | | | | | | |
|---|---|---|---|---|---|---|---|
| Zinc Rate (kg/ha) | Zinc Sulfate | StZ (1.0) | StZ (1.36) | StZ (1.27) (g/pot DM) | StZ (1.22) | StZ (1.17) | Mean |
| 0 | 7.24 | 7.24 | 7.24 | 7.24 | 7.24 | 7.24 | 7.24 |
| 1 | 9.40 | 7.38 | 8.14 | 8.89 | 10.29 | 9.84 | 8.99 |
| 2 | 10.5 | 9.01 | 7.36 | 9.97 | 9.39 | 9.70 | 9.32 |
| 4 | 8.54 | 8.01 | 7.45 | 7.55 | 10.13 | 10.02 | 8.61 |
| Mean | 8.92 | 7.91 | 7.55 | 8.41 | 9.26 | 9.2 | |

| Effect | Sign. | lsd 5% |
|---|---|---|
| Product | 0.01 | 1.09 |
| Rate | 0.0001 | 0.89 |
| Reps | 0.01 | |
| P × R | 0.44 | |

TABLE 18

Effect of zinc product and
zinc rate on the zinc concentration in the dry matter of sorghum

| | ZINC PRODUCT | | | | | | |
|---|---|---|---|---|---|---|---|
| Zinc Rate (kg/ha) | Zinc Sulfate | StZ (1.0) | StZ (1.36) | StZ (1.27) (g/pot DM) | StZ (1.22) | StZ (1.17) | Mean |
| 0 | 8.3 | 9.7 | 8.3 | 8.3 | 8.3 | 7.3 | 8.4 |
| 1 | 10.3 | 9.7 | 10.7 | 10.7 | 9 | 8.7 | 9.8 |
| 2 | 14.3 | 13.3 | 15.7 | 12.3 | 13.7 | 12.33 | 13.4 |
| 4 | 20 | 16 | 18 | 22.3 | 16 | 13 | 17.6 |
| Mean | 13.3 | 12.2 | 13.2 | 13.4 | 11.5 | 10.3 | |

| Effect | Sign. | lsd 5% |
|---|---|---|
| Product | 0.004 | 1.69 |
| Rate | 0.000 | 1.38 |
| Reps | 0.000 | |
| P × R | 0.000 | |

TABLE 19

| | ZINC PRODUCT | | | | | | |
|---|---|---|---|---|---|---|---|
| Zinc Rate (kg/ha) | Zinc Sulfate | StZ (1.0) | StZ (1.36) | StZ (1.27) (g/pot DM) | StZ (1.22) | StZ (1.17) | Mean |
| 0 | 6 | 6.9 | 6 | 6 | 6 | 5.3 | 6.1 |
| 1 | 9.9 | 7.2 | 8.6 | 9.3 | 9.2 | 8.6 | 8.8 |
| 2 | 14.9 | 12.0 | 11.5 | 12.2 | 11.7 | 12.3 | 12.4 |
| 4 | 17.9 | 12.7 | 13.3 | 16.8 | 16.4 | 12.9 | 15.0 |
| Mean | 12.2 | 9.7 | 9.9 | 11.1 | 10.9 | 9.8 | |

| Effect | Sign. | lsd 5% |
|---|---|---|
| Product | 0.208 | 2.3 |
| Rate | 0.000 | 1.8 |
| Reps | 0.000 | |
| P × R | 0.91 | |

LEGEND

Figure 2:
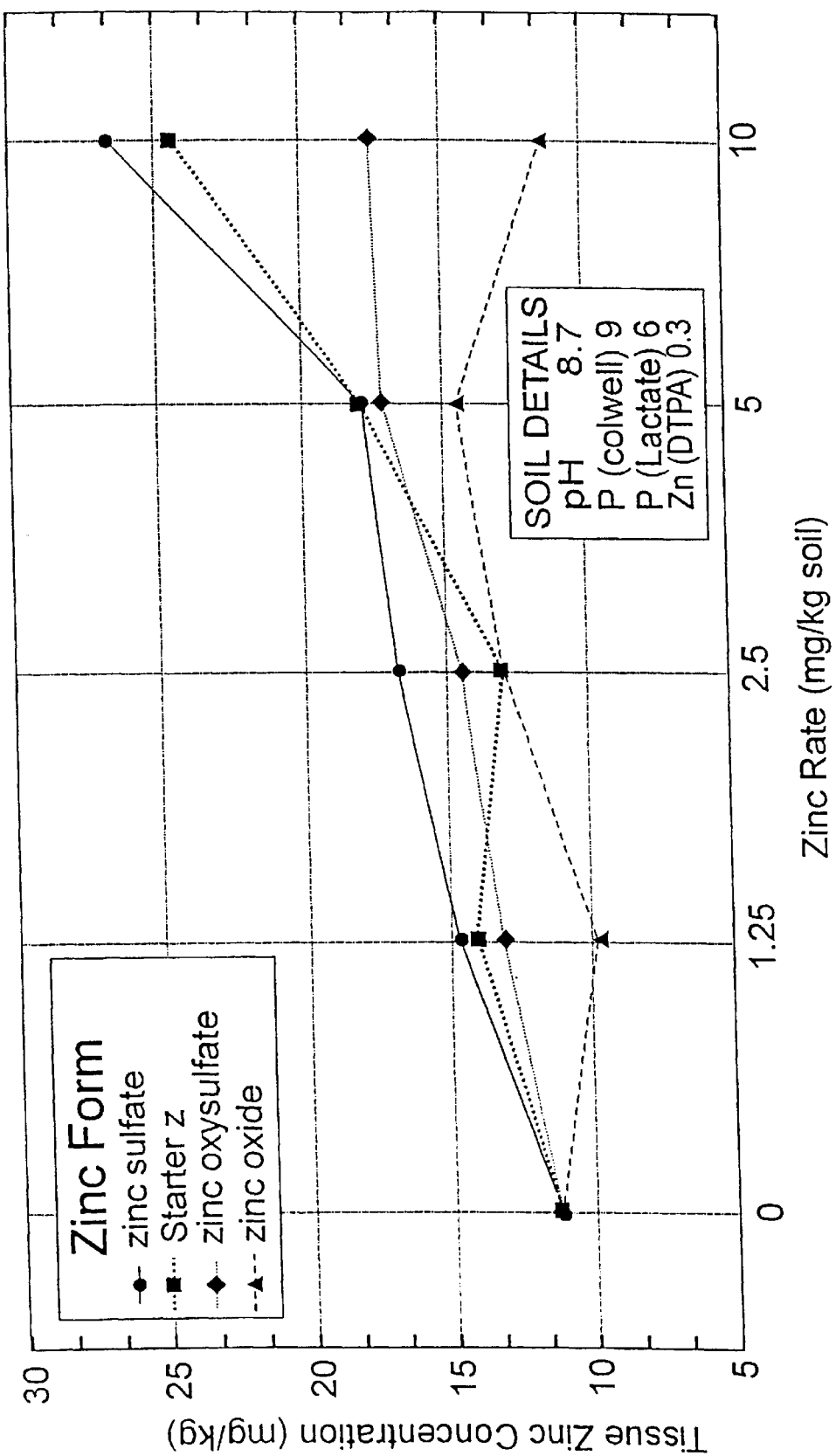
FIG. 2 This figure represents a Zinc Product Comparison Experiment—Yallaroi Soil—Wheat—1994.
Figure 3:
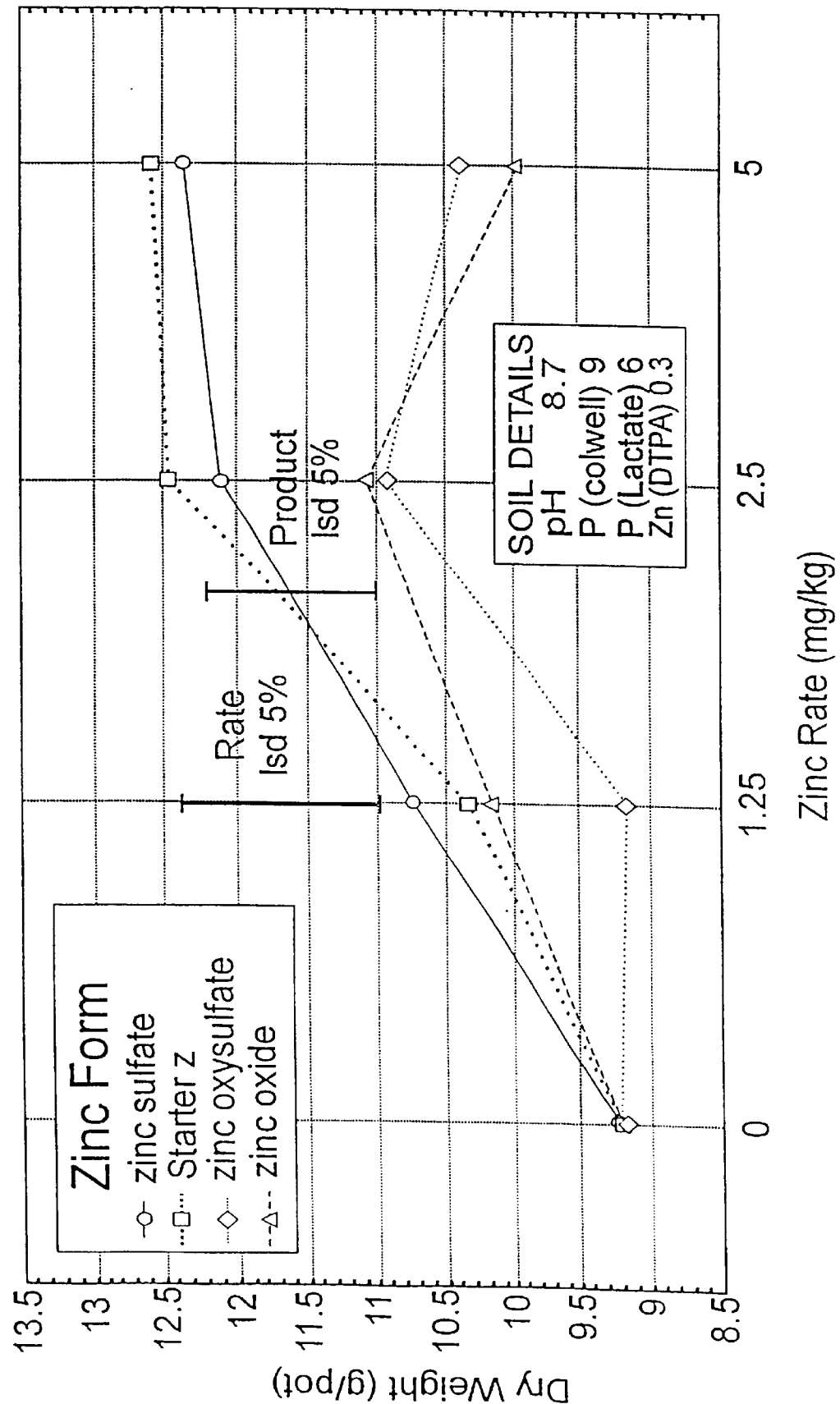
FIG. 3 This figure represents a Zinc Product Comparison Experiment—Yallaroi Soil—Wheat—1994.
Figure 4:
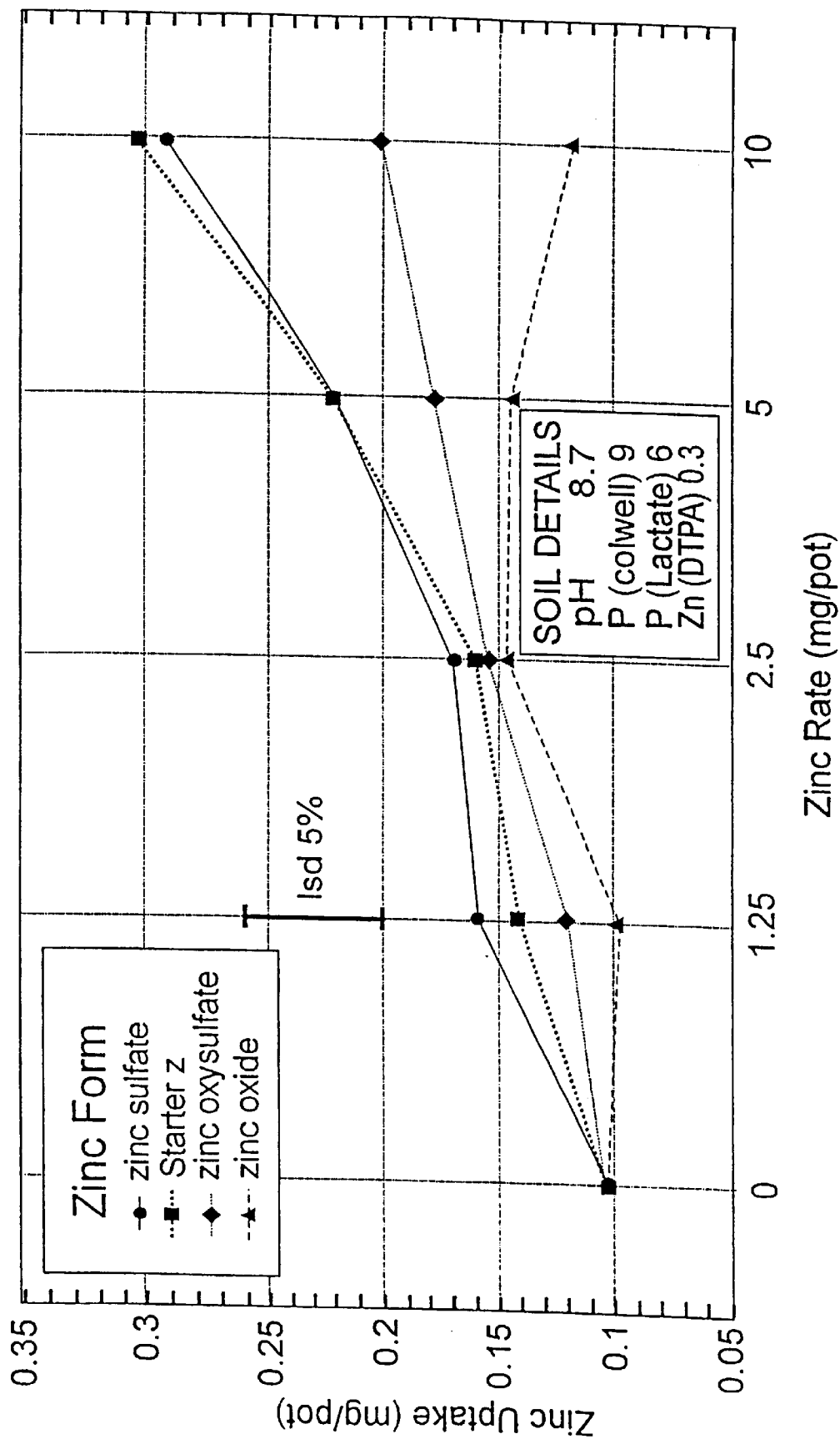
FIG. 4 This figure represents a Zinc Product Comparison Experiment—Yallaroi Soil—Wheat—1994.
Figure 5:
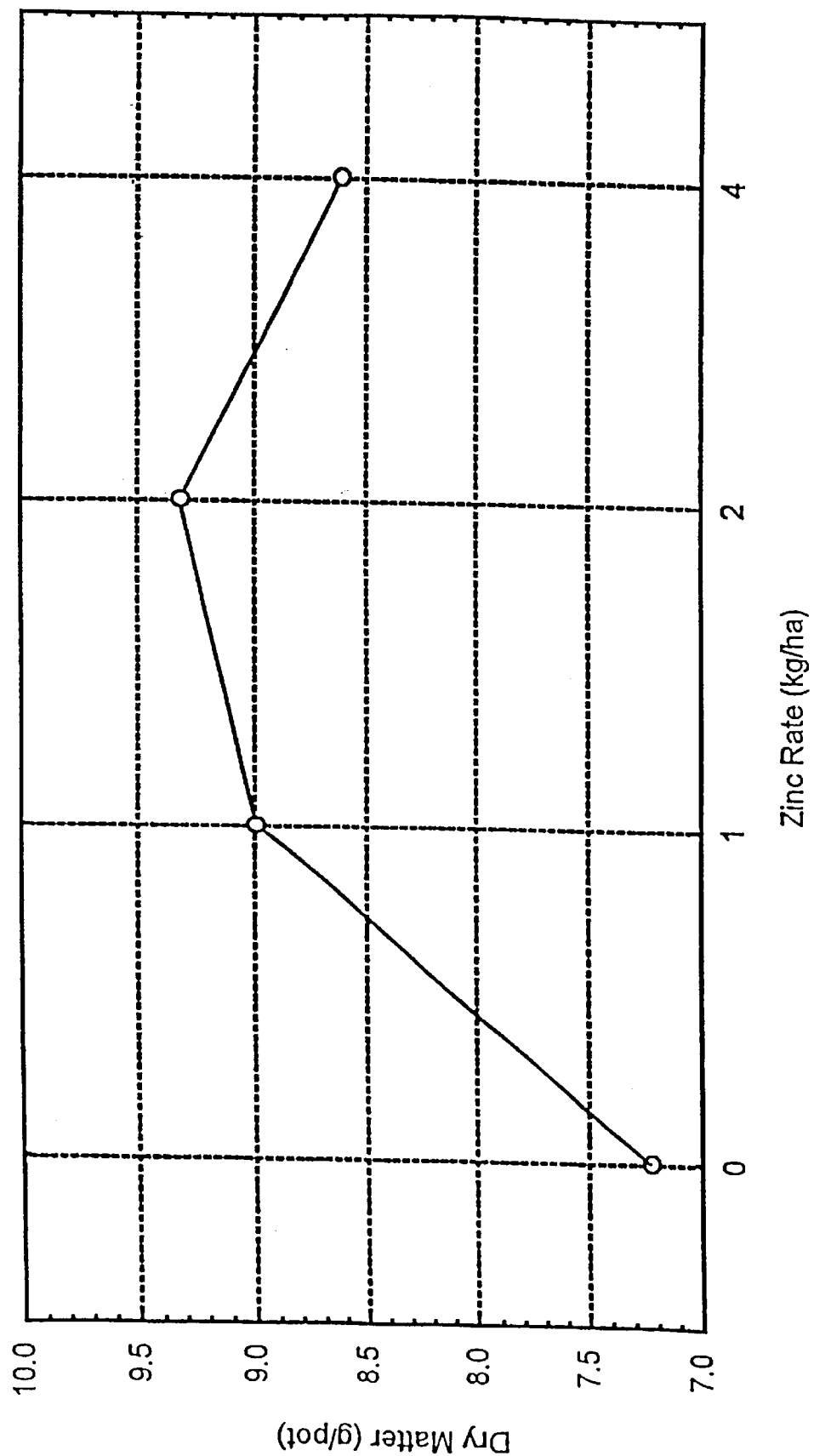
FIG. 5 This figure illustrates that an increase in soil zinc supply increases the dry matter production in sorghum.
Figure 6:
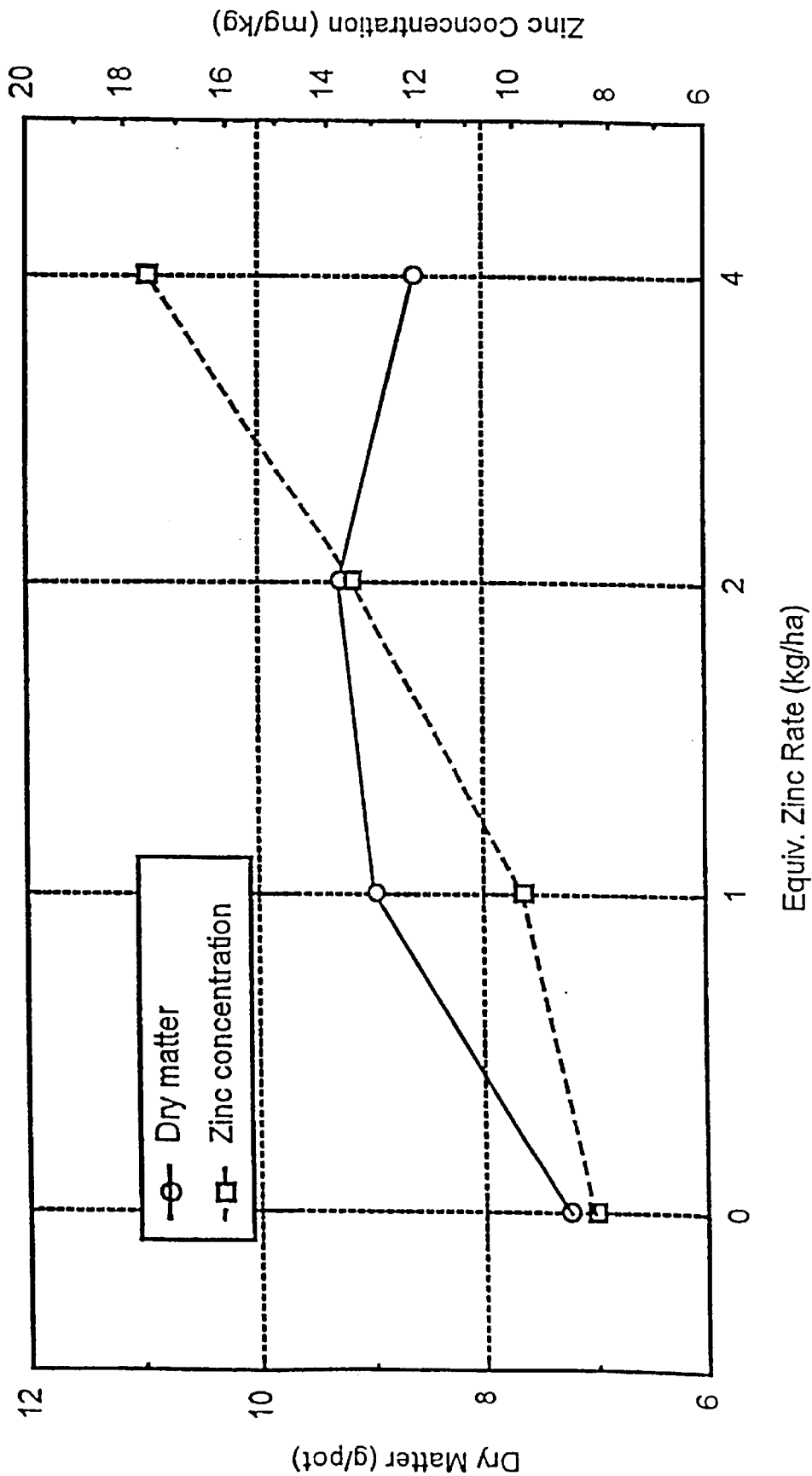
FIG. 6 This figure illustrates the determination of the critical concentration of dry matter production form dry matter accumulation and tissue zinc concentration.
Figure 7:
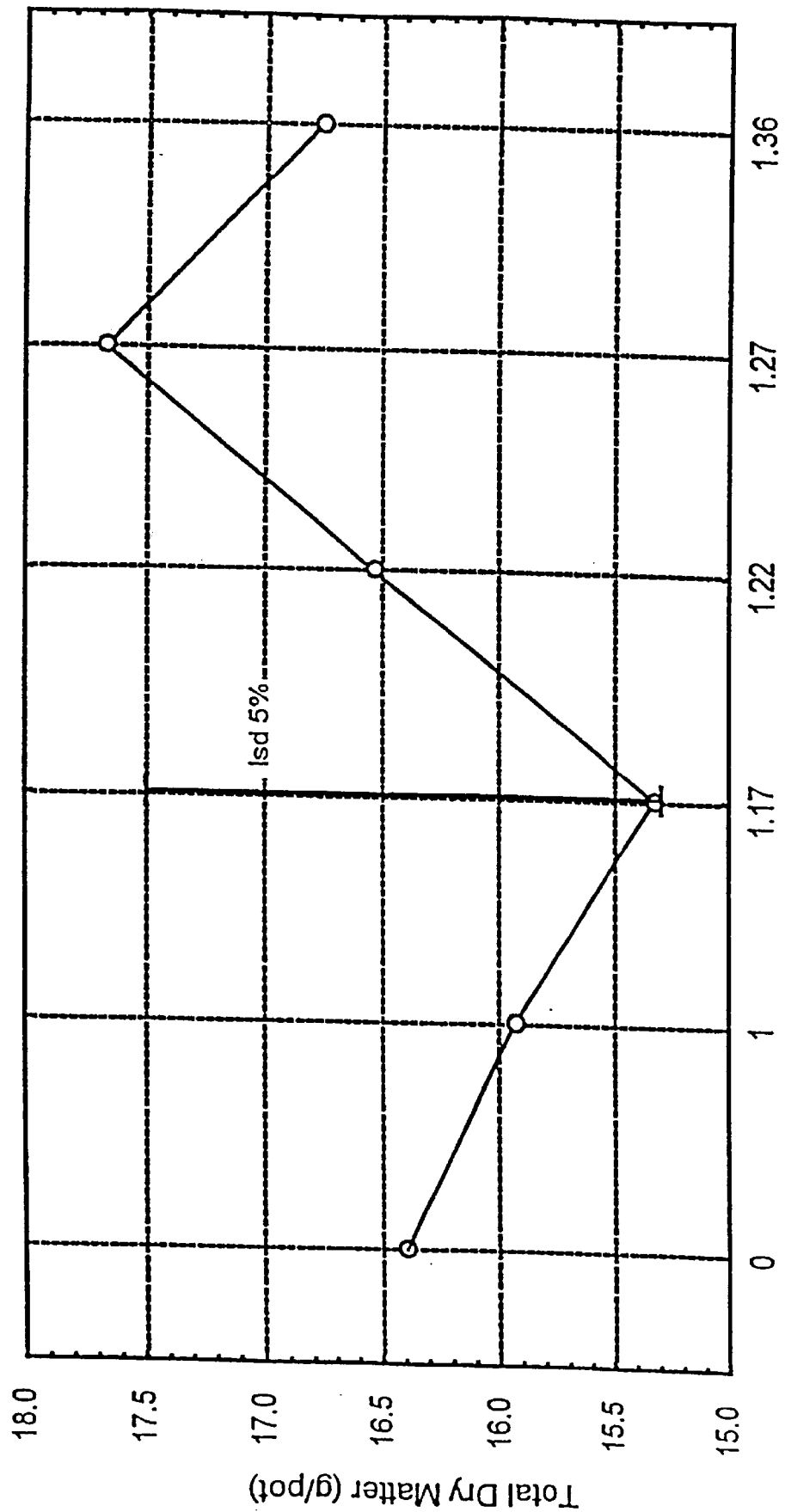
FIG. 7 This figure illustrates that the ammoniation rate of StZ affects the dry matter production in sorghum.

Table 15
* mean of other three product control rates
FIG. 2
Zinc Product Comparison Experiment—Yallaroi Soil—Wheat—1994
FIG. 3
Zinc Product Comparison Experiment—Yallaroi Soil—Wheat—1994
FIG. 4
Zinc Product Comparison Experiment—Yallaroi Soil—Wheat—1994
FIG. 5
An increase in soil zinc supply increases the dry matter production in sorghum.
FIG. 6
Determination of the critical concentration of dry matter production from dry matter accumulation and tissue zinc concentration.
FIG. 7
Ammoniation rate of StZ affects the dry matter production in sorghum.
FIG. 8
Ammoniation rate of Stz affects the tissue zinc concentration in sorghum.

What is claimed is:

1. A process for making a co-granulate said co-granulate consisting of a zinc source and ammonium phosphate, said consulate providing a zinc uptake in soil and plants of at least 70–80% of the zinc uptake provided by application of an equivalent amount of zinc in the form of zinc sulfate said process comprising the steps of:
   (i) adding solid ammonium phosphate having an N/P ratio of 0.6–1.9 and said zinc source in the form of a slurry, suspension or particles to a granulator vessel to form said co-granulate; and
   (ii) drying the co-granulate.

2. A process as claimed in claim 1 wherein the ammonium phosphate and zinc source are mixed with each other before being fed into the granulator vessel.

3. A process as claimed in claim 1 wherein the ammonium phosphate and zinc source are mixed with each other in the granulator vessel.

4. A process as claimed in claim 1 wherein the N/P ratio is between 0.8–1.5.

5. A process as claimed in claim 1 wherein the zinc source is zinc oxide or zinc sulfate.

6. A process as claimed in claim 5 wherein the zinc source is zinc oxide.

7. A process as claimed in claim 5 wherein the zinc source is zinc oxide.

8. A process as claimed in claim 1 wherein ammonia is charged into the granulator vessel.

9. A process as claimed in claim 8 wherein the ammonium sulfate comprises particles of a size between 0.05–4 mm.

10. A process as claimed in claim 9 wherein the ammonium phosphate comprises particles of a size between 0.05–4 mm.

11. A process as claimed in claim 9 wherein the particles are about 1 mm.

12. The process of claim 3, wherein said N/P ratio is between 0.8–1.25.

13. The process of claim 3, wherein said N/P ratio is 1.0–1.5.

14. The process of claim 3, wherein said N/P ratio is 1.0–1.25.

15. The process of claim 1, wherein said granulator vessel is a single granulator vessel.

16. A co-granulate of zinc and ammonium phosphate when obtained by the process of claim 1.

17. A co-granulate of zinc source and ammonium phosphate having an N/P ratio of 0.6–1.9 which produces a zinc uptake in soil and plants of at least 70–80% of the zinc uptake provided by application of an equivalent amount of zinc in the form of zinc sulfate.

18. The co-granulate of claim 17, further comprising a minimum zinc content of 2.5%.

19. The co-granulate of claim 17, wherein said N/P ratio is 0.8–1.5.

20. The co-granulate of claim 17, wherein said N/P ratio is 1.0–1.5.

21. The co-granulate of claim 17, wherein said N/P ratio is 0.8–1.25.

22. The co-granulate of claim 17, wherein said N/P ratio is 1.0–1.25.

23. The co-granulate of claim 17, wherein said N/P ratio is 1. 15–1.25.

24. A method for using a zinc ammonium fertilizer, said fertilizer consisting a co-granulate zinc source and ammonium phosphate having an N/P ratio of 0.6–1.9 which produces a zinc uptake in soil and plants of at least 70–80% of the zinc uptake provided by an application of an equivalent amount of zinc in the form of zinc sulfate wherein said method comprises:

applying said fertilizer to soil and/or plants at an application rate within the range 1–10 kgha$^{-1}$ Zn.

25. The method of claim 24, further comprising an application rate of said fertilizer that is in the range of 1–3 kgha$^{-1}$ Zn.

26. A process for making a co-granulate comprising a zinc source and ammonium phosphate, said co-granulate providing a zinc uptake in soil and plants of at least 70–80% of the zinc uptake provided by application of an equivalent amount of zinc in the form of zinc sulfate said process comprising the steps of:

(i). Mixing solid ammonium phosphate having an N/P ratio of 0.6–1.9 and said zinc source in the form of a slurry, suspension or particles in a granulator vessel to form said co-granulate; and (ii). Drying said co-granulate.

27. The process of claim 26, wherein ammonia is charged into said granulator vessel.

* * * * *